(12) United States Patent
Kim et al.

(10) Patent No.: US 6,480,527 B1
(45) Date of Patent: Nov. 12, 2002

(54) CDMA DEMODULATING METHOD AND DEMODULATOR

(75) Inventors: Eung-sun Kim, Yongin (KR); Ji-yong Chun, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 1 day.

(21) Appl. No.: 09/615,718

(22) Filed: Jul. 13, 2000

(30) Foreign Application Priority Data

Jul. 13, 1999 (KR) ............................................ 99-28205

(51) Int. Cl.⁷ ............................................ H04B 10/148

(52) U.S. Cl. ........................................ 375/147; 375/150

(58) Field of Search ................................. 375/130, 140, 375/141, 142, 147, 150; 370/209, 302, 335, 342, 441, 320

(56) References Cited

U.S. PATENT DOCUMENTS

| | | | | |
|---|---|---|---|---|
| 5,812,543 A | * | 9/1998 | Sugita ........................ | 370/335 |
| 5,940,434 A | * | 8/1999 | Lee et al. ................... | 370/335 |
| 6,075,778 A | * | 6/2000 | Sugita ........................ | 370/252 |
| 6,115,410 A | * | 9/2000 | Naruse ....................... | 370/209 |
| 6,317,422 B1 | * | 11/2001 | Khaleghi et al. ........... | 370/208 |
| 6,414,988 B1 | * | 7/2002 | Ling .......................... | 370/209 |

\* cited by examiner

*Primary Examiner*—Chi Pham
*Assistant Examiner*—Khanh C. Tran
(74) *Attorney, Agent, or Firm*—Lee & Sterba, P.C.

(57) ABSTRACT

A code division multiple access (CDMA) demodulating method and demodulator employing the demodulating method, the CDMA demodulating method including the steps of: (a) sequentially-storing all input data, which are over-sampled by M-fold and go through a number (N) of paths, in a predetermined first memory, where M and N are predetermined positive integers; (b) generating PN codes for each of the N paths and storing the PN codes in a predetermined second memory; (c) generating and sequentially-storing traffic walsh codes of one period, which correspond to a processing gain L, in a predetermined third memory; (d) multiplying a complex-conjugated value with one of the values stored in the first memory and one of the values stored in the second memory; (e) performing a control operation for storing the PN codes in a predetermined address of the second memory and a control operation for outputting data for each of the N paths from the first, second, and third memories; (f) multiplying the resultant value of the step (d) with the traffic walsh codes of a corresponding path of data stored in the third memory; (g) cumulatively summing the resultant value of the step (f) L times for each of the N multi-paths to be processed, where L corresponds to the processing gain; (h) complex-conjugating the resultant value of the step (d) by cumulatively adding the resultant value of the step (d) X times for each of the N multi-path to be processed, where X corresponds to the data bit number of the walsh codes; (i) obtaining a number (N) of data by inputting the resultant value of the step (f) and the resultant value of the step (h) and multiplying the resultant value of the step (f) with the resultant value of the step (h); (j) sequentially-obtaining a number (N) of values by sequentially-inputting the number (N) of data obtained in the step (i) and taking only real values; (k) cumulatively summing the data obtained in the step (i) N times; and (l) deciding bit values based on logic values identified by identifying the logic values of the result of the step (k), whereby the complexity of the system and the power consumption may be reduced in terms of the number of necessary devices by allowing for suitable downloading of software and performing a demodulation operation in a processor.

8 Claims, 7 Drawing Sheets

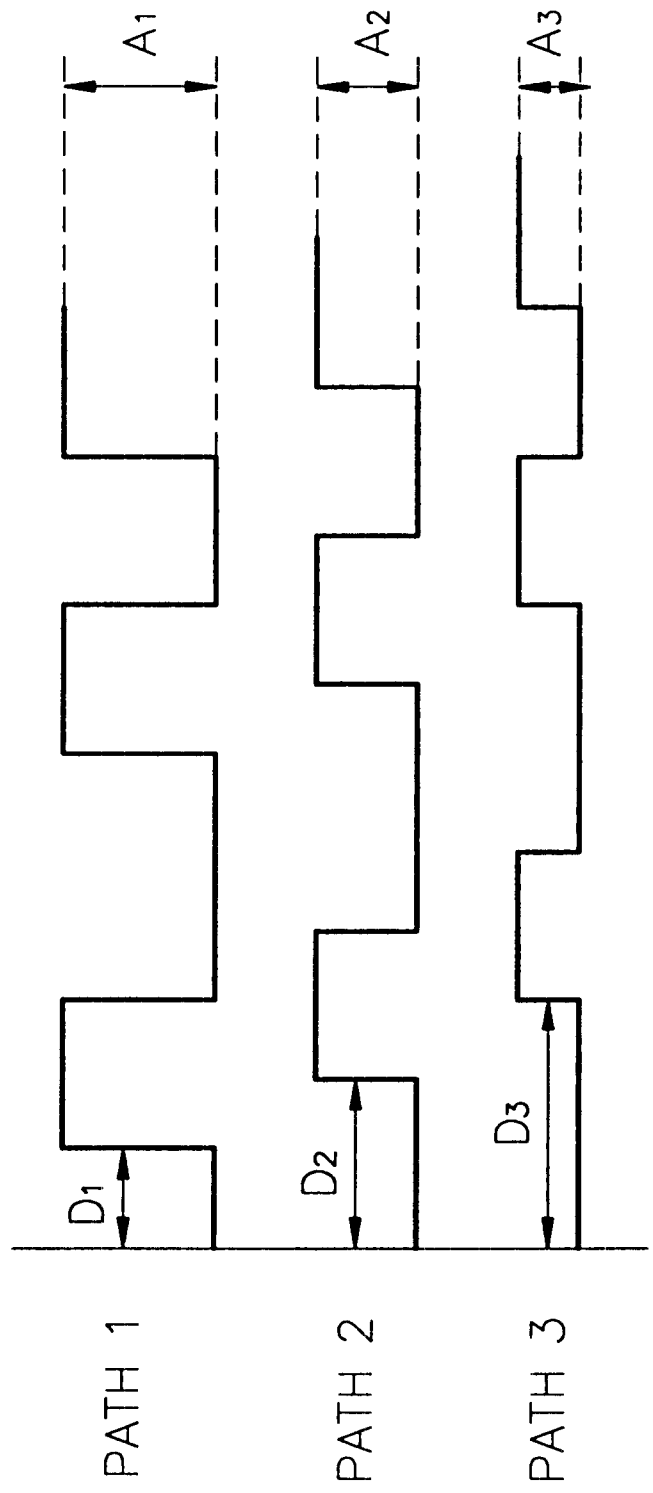

CDMA DEMODULATING METHOD AND DEMODULATOR

BACKGROUND OF THE INVENTION

1. Field of the Invention

The present invention relates to a code division multiple access (hereinafter referred to as CDMA) demodulating method and demodulator, and more particularly, to a CDMA demodulating method and demodulator, in which the architectural complexity of hardware is reduced so that various services may be provided only by software download.

2. Description of the Related Art

In general, in a CDMA receiver, which receives a CDMA signal after it has passed through a wireless channel, signal components having different delays and amplitudes are added to the CDMA signal. According to conventional CDMA demodulating methods, PN codes and walsh codes are generated and multiplied with a received CDMA signal. Next, weighting values are given to signals after they have been multiplied by the PN codes, the weighted signals are phase adjusted, and the resultant signals are summed.

FIG. 1 illustrates a block diagram of the structure of a conventional CDMA demodulator. Referring to FIG. 1, the conventional CDMA demodulator includes as many fingers as the number of multi-paths to be considered and thereby processes the received CDMA signal by generating PN codes and traffic walsh codes, which vary according to the degree of delay of each path.

However, in the conventional CDMA receiver, a number (N) of PN-codes generators and traffic walsh codes-generators must operate simultaneously and consecutively with respect to a number (N) of the multi-paths. However, since the traffic walsh codes-generator operates when the traffic walsh codes of only one period are generated, it is necessary to reduce the architectural complexity of the hardware and the power consumption.

SUMMARY OF THE INVENTION

It is feature of the present invention to provide a CDMA demodulating method having a suitable architecture for implementation on a processor so that the architectural complexity of hardware can be reduced and various services can be provided only by software download.

Another feature of the present invention is to provide a CDMA demodulator using the CDMA demodulating method.

These and other features of the present invention may be achieved according to one aspect of the present invention, wherein there is provided a CDMA demodulating method. The CDMA demodulating method comprises the steps of (a) sequentially-storing all input data, which are over-sampled by M-fold and go through a number (N) of paths, in a predetermined first memory, where M and N are predetermined positive integers; (b) generating PN codes for each of the N paths and storing the PN codes in a predetermined second memory; (c) generating and sequentially-storing traffic walsh codes of one period, which correspond to a processing gain L, in a predetermined third memory; (d) multiplying a complex-conjugated value with one of the values stored in the first memory and one of the values stored in the second memory; (e) performing a control operation for storing the PN codes in a predetermined address of the second memory and a control operation for outputting data for each of the N paths from the first, second, and third memories; (f) multiplying the resultant value of the step (d) with the traffic walsh codes of a corresponding path of data stored in the third memory; (g) cumulatively summing the resultant value of the step (f) L times for each of the N multi-paths to be processed, where L corresponds to the processing gain; (h) complex-conjugating the resultant value of the step (d) by cumulatively adding the resultant value of the step (d) X times for each of the N multi-paths to be processed, where X corresponds to the data bit number of the walsh codes; (i) obtaining a number (N) of data by inputting the resultant value of the step (f) and the resultant value of the step (h) and multiplying the resultant value of the step (f) with the resultant value of the step (h); (j) sequentially-obtaining a number (N) of values by sequentially-inputting the number (N) of data obtained in the step (i) and taking only real values; (k) cumulatively summing the data obtained in step (i) N times; and (l) deciding bit values based on logic values identified by identifying the logic values of the result of the step (k).

In accordance with another aspect of the present invention, there is provided another CDMA demodulating method. This CDMA demodulating method comprises the steps of: (a) sequentially-storing all input data, which are over-sampled by M-fold and go through a number (N) of paths, in a predetermined first memory, where M and N are predetermined positive integers; (b) generating PN codes for each of the N paths; (c) storing the PN codes in a predetermined second memory; (d) complex-conjugating the PN codes; (e) checking whether traffic walsh codes of all one period are stored in a predetermined third memory; (f) sequentially-storing the traffic walsh codes by generating the traffic walsh codes, which correspond to a first access path, until traffic walsh codes of all one period, which corresponds to a processing gain L, are stored in a case where traffic walsh codes of all one period are not stored in the third memory; (g) omitting the performance of step (f) in a case where traffic walsh codes of all one period are stored in the third memory; (h) multiplying a complex-conjugated value with one of the values stored in the first memory and one of the values stored in the second memory; (i) performing a control operation for storing the PN codes in a predetermined address of the second memory and a control operation for outputting data for each of the N paths from the first, second, and third memories; (j) multiplying the resultant value of the step (h) with the traffic walsh codes of a corresponding path of data stored in the third memory; (k) cumulatively summing the resultant value of step (j) L times for each of the N multi-paths to be processed, where L corresponds to the processing gain; (l) cumulatively summing the resultant value of step (h) X times for each of the N multi-paths to be processed, where X corresponds to the data bit number of the walsh codes; (m) checking whether L-1 resultant values are accumulated; (n) checking whether N resultant values are accumulated when it is determined that the L-1 resultant values are not accumulated in the step (m); (o) repeatedly-performing steps (j) through (n) with respect to the values by outputting the values, which correspond to a next path in the first, second, third memories, when it is determined that the N resultant values are not accumulated in step (n); (p) performing steps (a) through (o) when it is determined that work with respect to the N-th path is completed in step (n); (q) performing steps (a) through (l) when it is determined that the L-1 resultant values are accumulated in step (m); (r) multiplying the complex-conjugated value of the resultant value of step (l) with the resultant value of step (k); (s) sequentially-obtaining a number (N) of values by sequentially-inputting the number (N) of data obtained in step (r) and taking only real values; (t) cumulatively summing the data obtained in step (s) N times; and (u) deciding bit values based on logic values identified by identifying the logic values of the result of step (t).

In another aspect of the present invention, there is provided a CDMA demodulator in which the above CDMA demodulating method is implemented. The CDMA demodulator comprises: a first memory for sequentially-storing input data, which are over-sampled by M-fold, where M is a predetermined positive integer; a PN codes-generating unit for generating different PN codes for each path; a second memory for sequentially-storing the PN codes output from the PN codes-generating unit; a first complex-conjugating unit for complex-conjugating the PN codes by inputting from the second memory the PN codes generated by the PN codes-generating unit; a first multiplying unit for multiplying a complex-conjugated value of one of the values stored in the second memory with one of the values stored in the first memory; a controlling unit for performing a control operation for storing the PN codes generated in the PN codes-generating unit in the same address as the modulo K-operated result, in the order in which the PN codes are received from the second memory and for performing a control operation for outputting data for each path from the first, second, and third memories; a second multiplying unit for multiplying a value output from the first multiplying unit with traffic walsh codes of a corresponding path of data stored in the third memory; an N-path L-accumulating unit for cumulatively-summing the output data of the second multiplying unit L times for each of the N paths to be processed, where L corresponds to the processing gain; an N-path X-accumulating unit for cumulatively-summing the data output from the first multiplying unit X times for each of the N multi-paths to be processed, where X corresponds to the data bit number of the walsh codes; a second complex-conjugating unit for complex-conjugating the output values of the N-path X-accumulating unit by inputting the output values of the N-path X-accumulating unit; a third multiplying unit for multiplying the output values of the second complex-conjugating unit with the output values of the N-path L-accumulating unit; a real-values extracting unit for sequentially and for each path independently inputting N data values output from the third multiplying unit, and for sequentially-outputting the N independent values for each path, and taking only real values; an accumulating unit for cumulatively-summing the data sequentially-output from the real-values extracting unit N times; and a bit-deciding unit for deciding bit values based on logic values identified by identifying the logic values of the output of the accumulating unit.

BRIEF DESCRIPTION OF THE DRAWINGS

The above features and advantages of the present invention will become more apparent by describing in detail a preferred embodiment thereof with reference to the attached drawings in which:

FIG. 4 illustrates the concept of a received CDMA signal so as to explain the CDMA demodulating method according to the present invention.

DETAILED DESCRIPTION OF THE INVENTION

Figure 1:
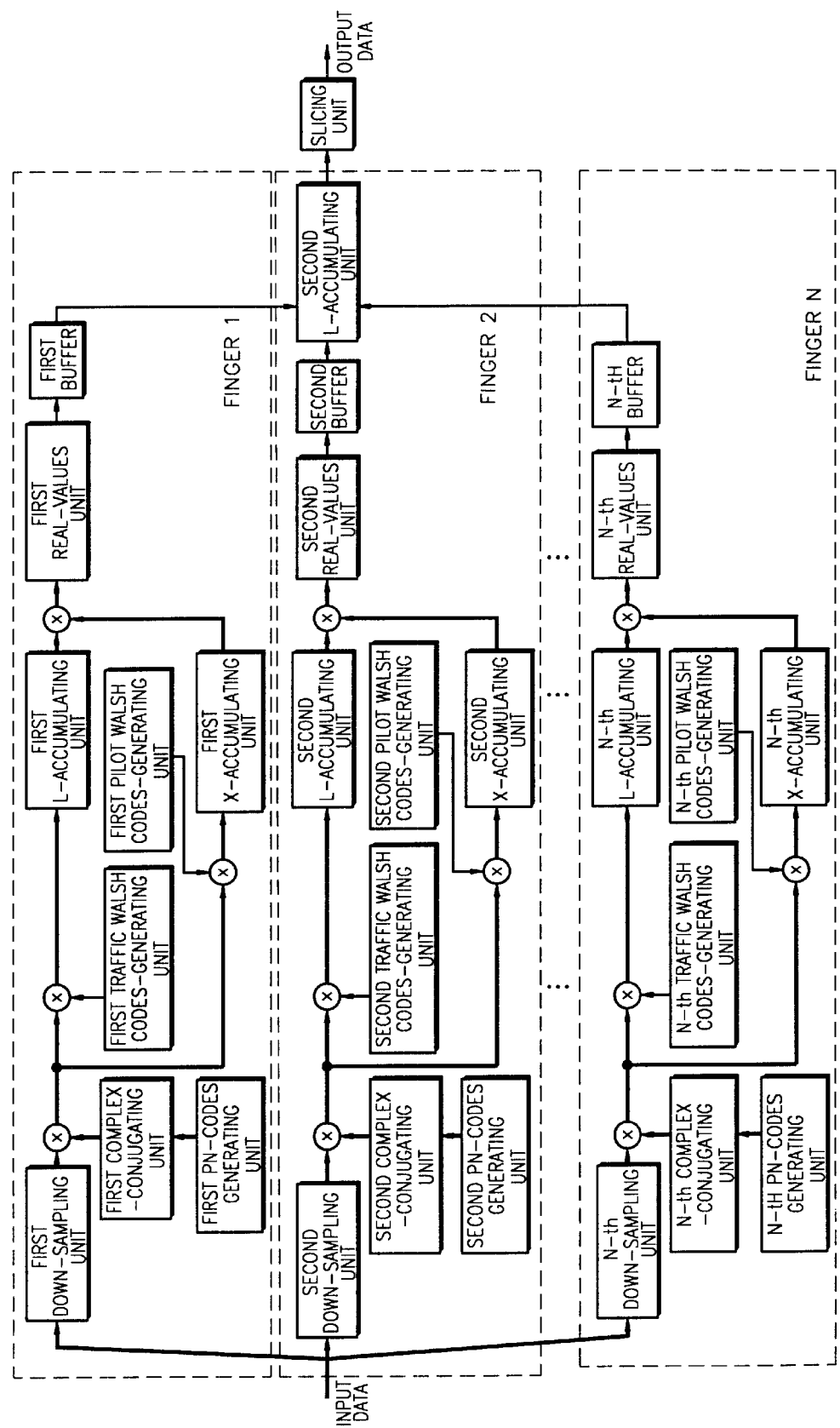
FIG. 1 is a block diagram of the structure of a conventional CDMA demodulator.
Figure 2:
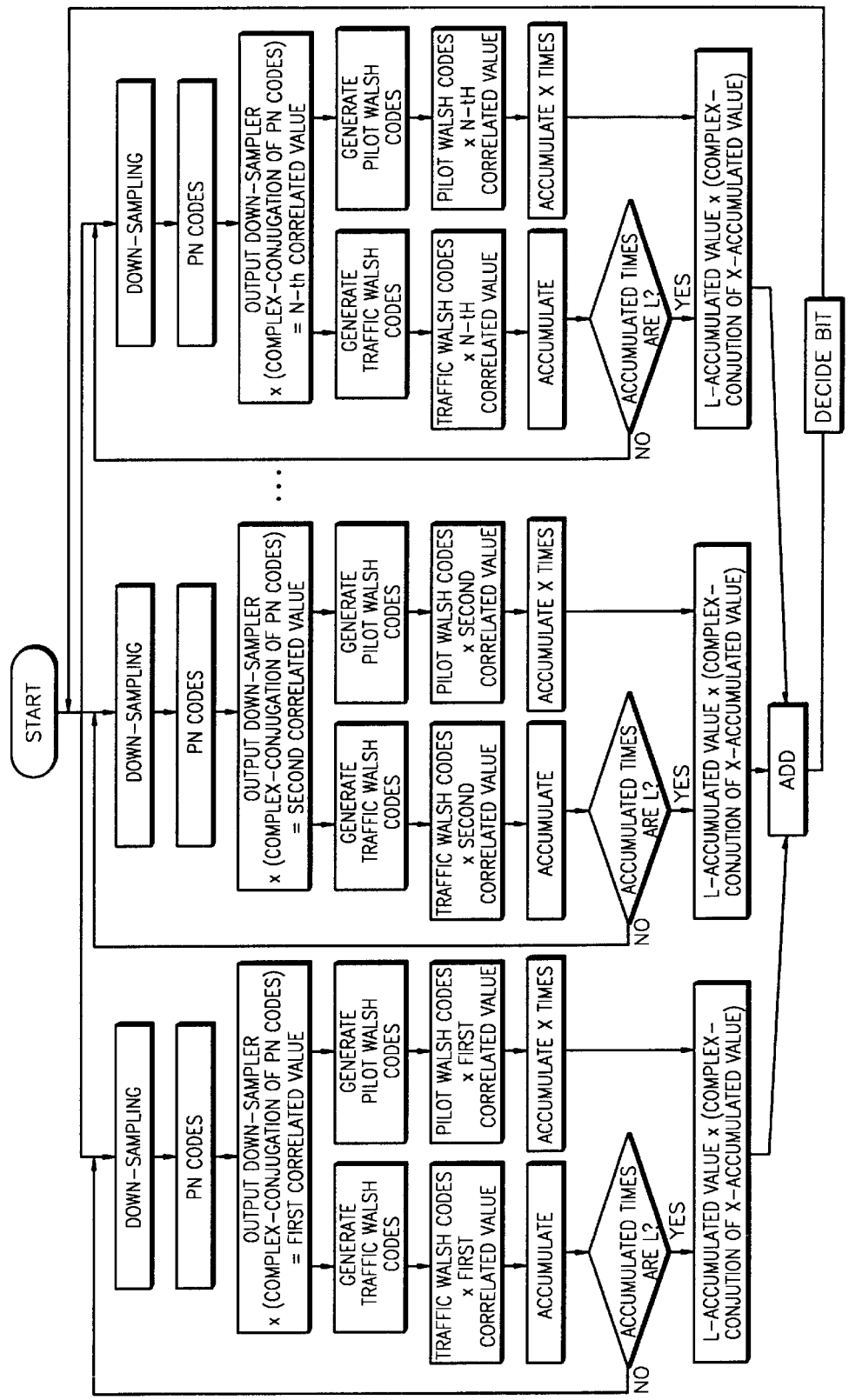
FIG. 2 is a flowchart illustrating the main steps of a conventional CDMA demodulating method implemented in the CDMA demodulator of FIG. 1.
Figure 3:
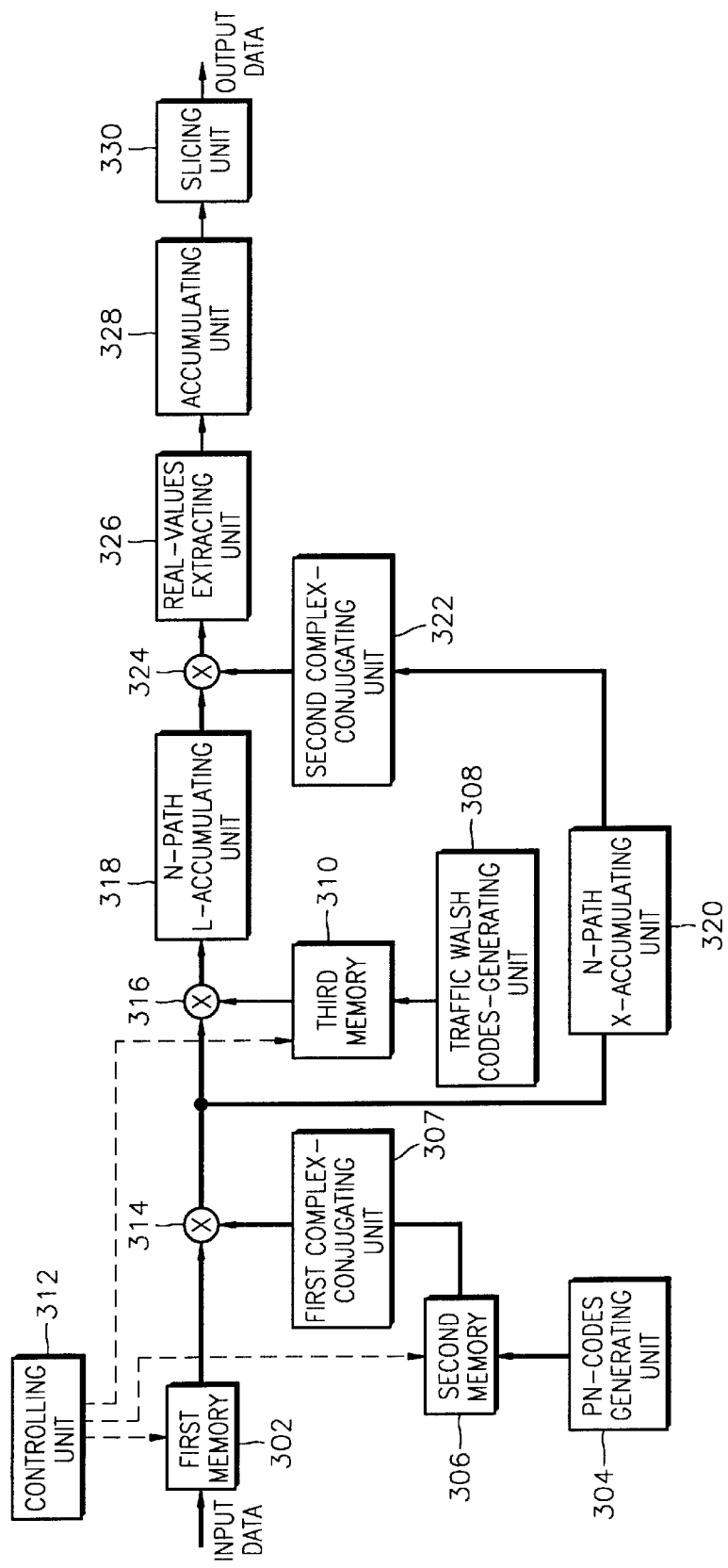
FIG. 3 is a block diagram of the structure of a CDMA demodulator according to a preferred embodiment of the present invention in which the CDMA demodulating method according to the present invention is implemented.
Figure 5A:
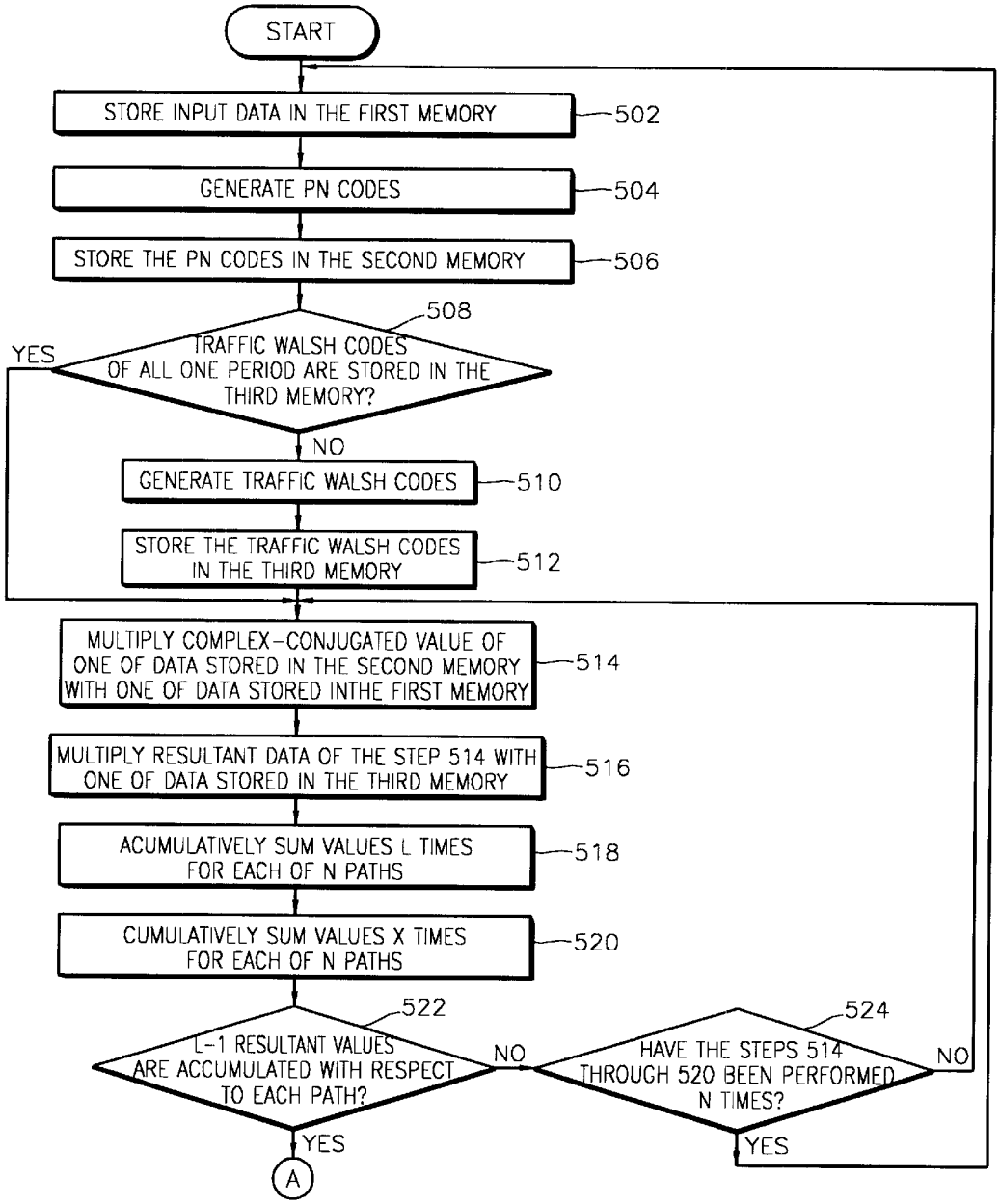
FIGS. 5A through 5C are flowcharts illustrating the main steps of the CDMA demodulating method according to the preferred embodiment of the present invention.
Figure 5B:
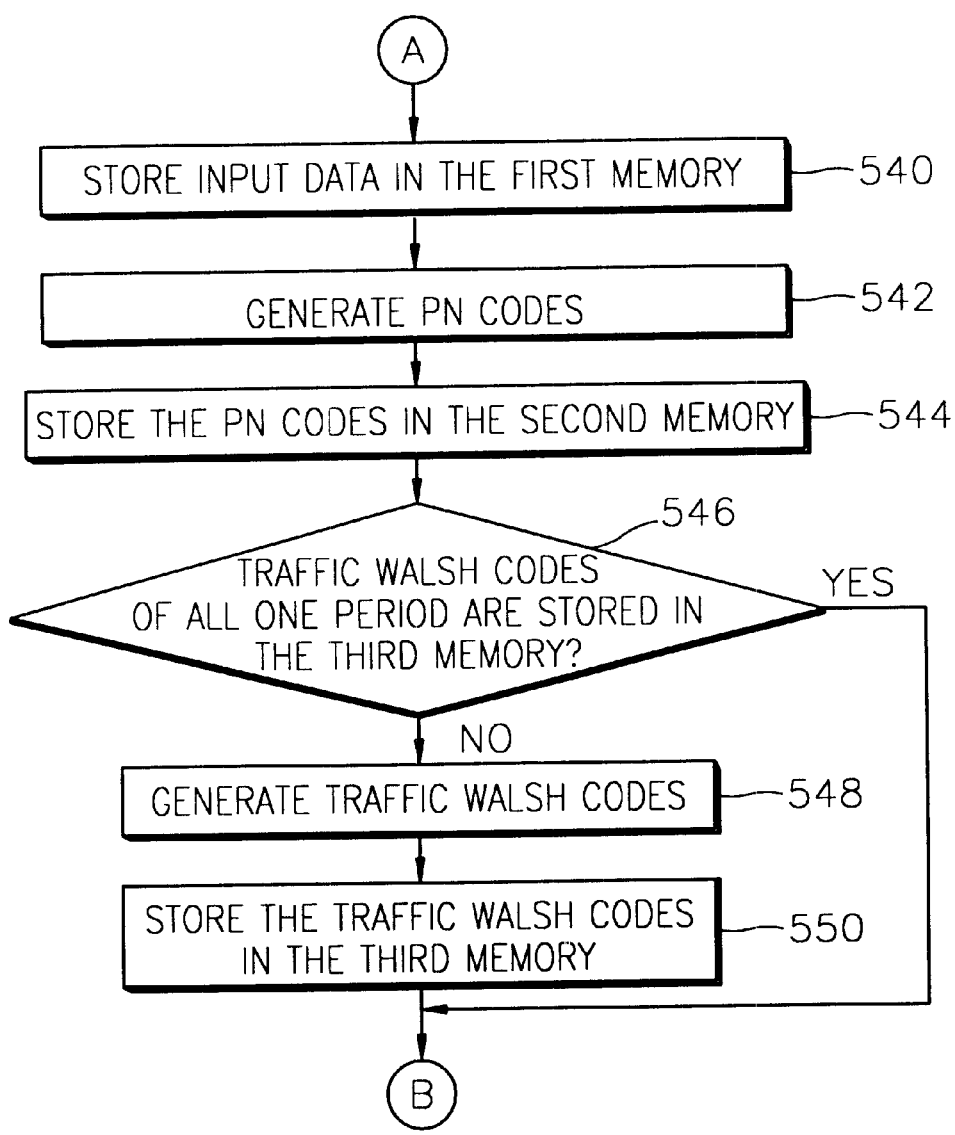
Figure 5C:
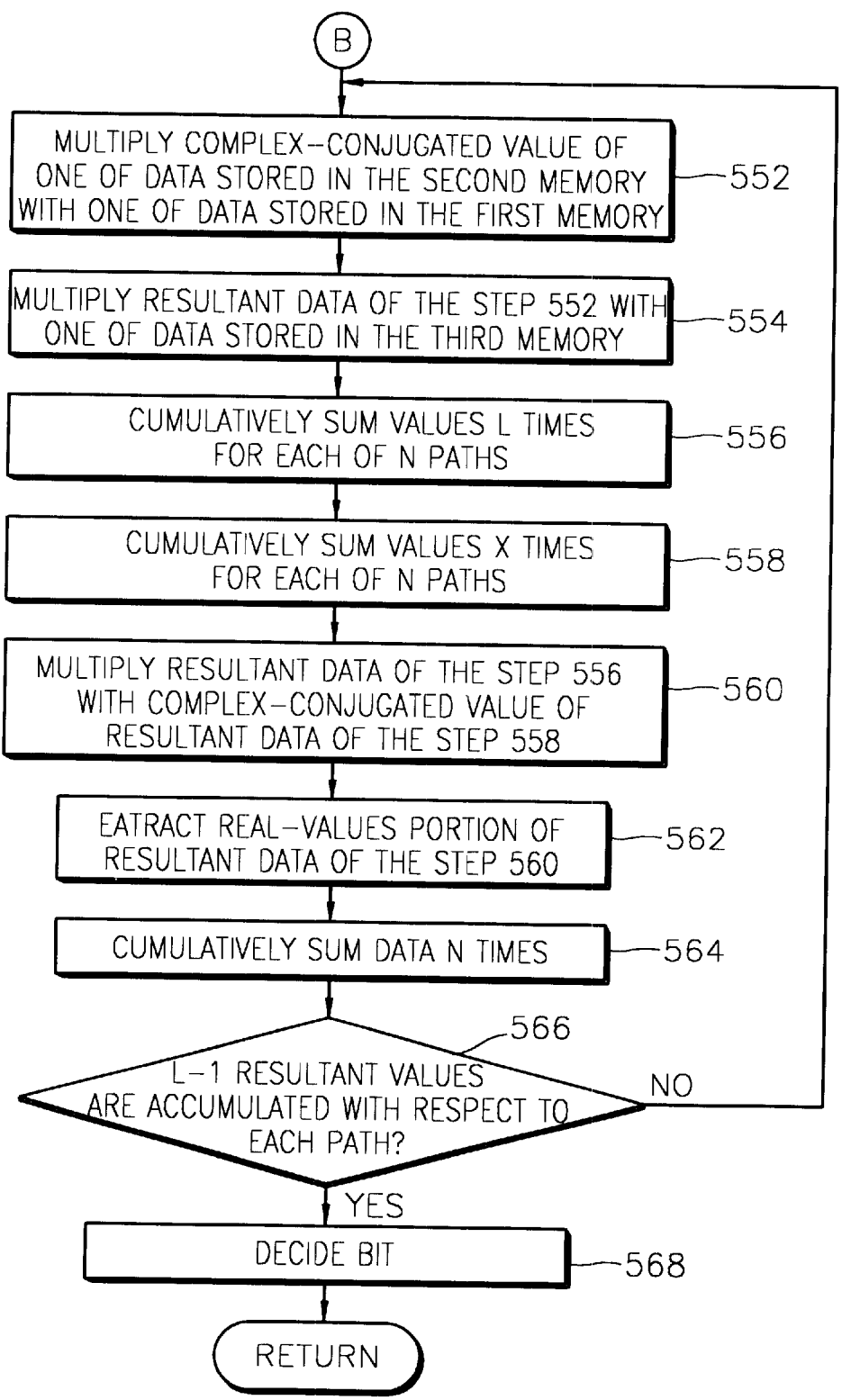

FIG. 3 is a block diagram of the structure of a CDMA demodulator according to a preferred embodiment of the present invention in which the CDMA demodulating method according to the present invention is implemented. FIG. 4 illustrates the concept of a received CDMA signal so as to explain the CDMA demodulating method according to the present invention, and FIGS. 5A through 5C are flowcharts illustrating the main steps of the CDMA demodulating method according to the preferred embodiment of the present invention. FIG. 5 will be referred to as occasion demands.

Referring to FIG. 3, the CDMA demodulator according to a preferred embodiment of the present invention in which the CDMA demodulating method according to the present invention is implemented, includes a first memory 302, a PN-codes generating unit 304, a second memory 306, a first complex-conjugating unit 307, a traffic walsh codes-generating unit 308, a third memory 310, a controlling unit 312, a first multiplying unit 314, a second multiplying unit 316, an N-path L-accumulating unit 318, an N-path X-accumulating unit 320, a second complex-conjugating unit 322, a third multiplying unit 324, a real-values extracting unit 326, an accumulating unit 328, and a slicing unit 330.

Before transmitting a CDMA signal to different users, a CDMA transmitter (not shown) multiplies a signal by specific traffic walsh codes and then PN codes. A CDMA receiver restores specific user's data bits by multiplying the received CDMA signal by walsh codes, which are assigned to the specific user, and then, PN codes. When the CDMA signal goes through multi-path channels, the CDMA signal has different delayed quantities $D_1$, $D_2$, and $D_3$ and amplitudes $A_1$, $A_2$, and $A_3$ with respect to the paths, as shown in FIG. 4. That is, a received CDMA signal is expressed by the sum of a plurality of signals. In other words, the plurality of signals having different delayed quantities, for example, $D_1$, $D_2$, and $D_3$ and amplitudes $A_1$, $A_2$, and $A_3$, as shown in FIG. 4 are added to the received CDMA signal after going through wireless channels, and the received CDMA signal is input to the CDMA demodulator. The CDMA demodulator uses several identical signals for effectively-restoring data. The CDMA demodulator generates walsh codes, which coincide with the delay of each path, and PN codes, and then, multiplies the walsh codes and the PN codes with the received CDMA signal. Next, weighting values are given to signals after they have been multiplied by the PN codes, the weighted signals are phase adjusted, and the resultant signals are summed.

First, input data, which are over-sampled by M-fold, are sequentially-stored in the first memory 302 (step 502). Accordingly, preferably, the first memory 302 is formed to have a size big enough to store an input signal having an over-sampling rate M. The first memory 302 performs a store operation continuously until all signals, which go through a number (N) of paths, are stored.

After that, the PN-codes generating unit 304 generates PN codes, which correspond to a first excess path (step 504) and stores the PN codes in the second memory 306 (step 506). When K is a positive integer, the size K of the second memory 306 is decided considering a maximum excess delay to be considered in the CDMA receiver. Preferably, the PN codes generated in the PN-codes generating unit 304 are stored in the same address as a modulo K-operated result, in the order in which the PN codes are received from the second memory 306. The phases of the PN codes, which are formed in the PN-codes generating unit 304, must coincide with the phases of the PN codes of the signal received from the first access path of the multi-paths to be processed in the CDMA demodulator. Next, the PN codes, which are generated by the PN-codes generating unit 304 and stored in the second memory 306, are output and then, complex-conjugated by the first complex-conjugating unit 307.

Next, it is checked whether traffic walsh codes of all one period are stored in the third memory 310 (step 508). In a case where traffic walsh codes of all one period are not stored in the third memory 310, the traffic walsh codes-generating unit 308 generates traffic walsh codes, which correspond to the first access path (step 510), and sequentially stores the traffic walsh codes in the third memory 310 until traffic walsh codes of all one period, which corresponds to a processing gain L, are stored in the third memory 310 (step 512). In a case where traffic walsh codes of all one period are stored in the third memory 310, steps 510 through 512 are omitted. The phases of the codes generated in the traffic walsh codes-generating unit 308 are identical with those of traffic walsh codes of a signal received from the first access path of the multi-paths to be processed in the CDMA receiver. Preferably, the size of the third memory 310 is decided considering the processing gain L.

Now, the first multiplying unit 314 multiplies a complex-conjugated value of one of the values stored in the second memory 306 with one of the values stored in the first memory 302 (step 514).

The controlling unit 312 performs a control operation for storing the PN codes generated in the PN codes-generating unit 304 in the same address as the modulo K-operated result, in the order in which the PN codes are received from the second memory 306, and a control operation for outputting data for each path from the first, second, and third memories 302, 306, and 310.

Next, the second multiplying unit 316 multiplies a value output from the first multiplying unit 314 with the traffic walsh codes corresponding to the first access path of data stored in the third memory 310 (step 516).

After that, the N-path L-accumulating unit 318 cumulatively sums the output data of the second multiplying unit 316 L times for each of the N multi-paths to be processed, where L corresponds to the processing gain. In this embodiment, the N-path L-accumulating unit 318 cumulatively sums values L times for each of N paths (step 518). According to the control operation output from the controlling unit 312 for outputting data for each path from the first, second, and third memories 302, 306, and 310, values corresponding to the first path, second path, and N-th path, are sequentially-input to the N-path L-accumulating unit 318. The N-path L-accumulating unit 318 cumulatively sums the values, which are sequentially-input and correspond to each path, independently for each path L times.

In the meantime, the N-path X-accumulating unit 320 cumulatively sums the data output from the first multiplying unit 314 X times for each of N paths (step 520). In this embodiment, the N-path X-accumulating unit 320 independently accumulates former X values output from the first multiplying unit 314 based on time when L resultant values-accumulation of the N-path L-accumulating unit 318 for each path is completed. Values, which correspond to the first path, second path, and up to last (N-th) path, are sequentially-output from the first multiplying unit 314. Accordingly, this process is sequentially and repeatedly performed with respect to each path. The N-path X-accumulating unit 320 cumulatively sums X times the values, which are sequentially-input and correspond to each path, for each path independently. When X resultant values-accumulation on each path is completed, the N-path X-accumulating unit independently accumulates the former X values output from the first multiplying unit 314 based on time when the next L resultant values-accumulation of the N-path L-accumulating unit 318 with respect to each path is completed.

When performances of the steps 504 through 520 with respect to the first path are completed, values corresponding to the second path in the first, second, and third memories 302, 306, and 310, are output, and the steps 514 through 520 are performed with respect to these values.

Like this, in the step 524, it is checked whether the steps 514 through 520 have been performed N times, and the steps 514 through 520 are performed with respect to the last N-th path by repeatedly-performing the steps. When it is determined that work with respect to the N-th path in the step 524 is completed, a new M-fold over-sampled input signal is sequentially-stored in the first memory 302. The steps 504 through 522 are repeatedly performed.

Only when a multiplication operation is performed from the time when L resultant values-accumulation is completed, it is possible to multiply values output from the N-path X-accumulating unit 320 with the complex-conjugated value by the second complex-conjugating unit 322 in the third multiplying unit 324. Accordingly, it is determined whether L-1 resultant values are accumulated (step 522), and the L-1 resultant values-accumulation with respect to the N number of paths is performed. Therefore, the step 522 is performed until a number (L-1) of values on each path are accumulated in the N-path L-accumulating unit 318 by checking whether the L-1 resultant values-accumulation is performed with respect to each path (step 522).

When it is determined in the step 522, in which checking is performed whether the L-1 resultant values-accumulation is performed with respect to each path, that the number (L-1) of values are accumulated on each path in the N-path L-accumulating unit 318, the steps shown in FIG. 5B are performed. Each of the steps 540, 542, 544, 546, 548, 550, 552, 554, 556, and 558 are substantially identical with those described above, Thus, a description thereof will be omitted.

The third multiplying unit 324 multiplies the output values of the second complex-conjugating unit 322 with the output values of the N-path L-accumulating unit 318 (step 560). Accordingly, the number (N) of values are sequentially and independently by path input to the third multiplying unit 324, and the third multiplying unit 324 sequentially-outputs the number (N) of independent values by path.

The real-values extracting unit 326 for sequentially and for each path independently inputting N data values output from the third multiplying unit 324, and for sequentially-outputting the N independent values for each path, and takes only real values (step 562). Here, it is possible for the third multiplying unit 324 and real-values extracting unit 326 to be performed as one step by combining their functions.

Next, the accumulating unit 328 accumulates data sequentially-output from the real-values extracting unit 326 by cumulatively summing the data sequentially-output from the real-values extracting unit 326 N times (step 564). The slicing unit 330 decides bit values based on logic values identified by identifying the logic values of the output of the real-values extracting unit 326 (step 568).

When a series of processes are passed through, all values processed by the number (N) of paths are summed by the accumulating unit 328. The bit of output data of the accumulating unit 328 is decided by using the slicing unit 330 (step 568).

In the CDMA demodulating method according to the present invention, only one PN-codes generator can be used regardless of the number of multi-paths to be considered in the CDMA receiver. Also, the CDMA demodulating method according to the present invention can remarkably reduce the number of necessary down-samplers, and additional means for controlling a buffer is unnecessary.

Accordingly, the present invention can reduce the complexity of system and the power consumption by reducing the number of necessary devices. Also, according to the CDMA demodulating method of the present invention, since there is no work simultaneously-performed, the present invention is suitable for downloading by software and performing a demodulation operation in a processor.

The CDMA demodulating method according to the present invention can be also realized as a program in the integrated circuit (IC) of a digital signal processor (DSP).

As described above, the present invention can reduce the architectural complexity of hardware and is suitable for downloading by software and performing a demodulation operation in a processor.

While the invention has been described with reference to particularly preferred embodiments and figures, those skilled in the art will appreciate that various modifications may be made to the invention without departing from the spirit and scope thereof.

What is claimed is:

1. A code division multiple access (CDMA) demodulating method performed in a CDMA system, comprising the steps of:
    (a) sequentially-storing all input data, which are over-sampled by M-fold and go through a N number of paths, in a predetermined first memory, where M and N are predetermined positive integers;
    (b) generating PN codes for each of the N paths and storing the PN codes in a predetermined second memory;
    (c) generating and sequentially-storing traffic walsh codes of one period, which correspond to a processing gain L, in a predetermined third memory;
    (d) multiplying a complex-conjugated value with one of values stored in the first memory and one of values stored in the second memory;
    (e) performing a control operation for storing the PN codes in a predetermined address of the second memory and a control operation for outputting data for each of the N paths from the first, second, and third memories;
    (f) multiplying the resultant value of the step (d) with the traffic walsh codes of a corresponding path of data stored in the third memory;
    (g) cumulatively summing the resultant value of the step (f) L times for each of the N multi-paths to be processed, where L corresponds to the processing gain;
    (h) complex-conjugating the result value of the step (d) by cumulatively adding the resultant value of the step (d) X times for each of the N multi-paths to be processed, where X corresponds to the data bit number of the walsh codes;
    (i) obtaining a number (N) of data by inputting the resultant value of the step (f) and the resultant value of the step (h) and multiplying the resultant value of the step (f) with the resultant value of the step (h);
    (j) sequentially-obtaining a number (N) of values by sequentially-inputting the number (N) of data obtained in the step (i) and taking only real values;
    (k) cumulatively summing the data obtained in the step (i) N times; and
    (l) deciding bit values based on logic values identified by identifying the logic values of the result of the step (k).

2. A code division multiple access (CDMA) demodulating method performed in a CDMA system, comprising the steps of:
    (a) sequentially-storing all input data, which are over-sampled by M-fold and go through a number (N) of paths, in a predetermined first memory, where M and N are predetermined positive integers;
    (b) generating PN codes for each of the N paths;
    (c) storing the PN codes in a predetermined second memory;
    (d) complex-conjugating the PN codes;
    (e) checking whether traffic walsh codes of all one period are stored in a predetermined third memory;
    (f) sequentially-storing the traffic walsh codes by generating the traffic walsh codes, which correspond to a first access path, until traffic walsh codes of all one period, which corresponds to a processing gain L, are stored in a case where traffic walsh codes of all one period are not stored in the third memory;
    (g) omitting the performance of the step (f) in a case where traffic walsh codes of all one period are stored in the third memory;
    (h) multiplying a complex-conjugated value with one of the values stored in the second memory and one of the values stored in the first memory;
    (i) performing a control operation for storing the PN codes in a predetermined address of the second memory and a control operation for outputting data for each of the N paths from the first, second, and third memories;
    (j) multiplying the resultant value of the step (h) with the traffic walsh codes of a corresponding path of data stored in the third memory;
    (k) cumulatively summing the resultant value of the step (j) L times for each of the N multi-paths to be processed, where L corresponds to the processing gain;
    (l) cumulatively summing the resultant value of the step (h) X times for each of the multi-paths to be processed, where X corresponds to the data bit number of the walsh codes;
    (m) checking whether L-1 resultant values are accumulated;
    (n) checking whether N resultant values are accumulated when it is determined that the L-1 resultant values are not accumulated in the step (m);
    (o) repeatedly-performing the steps (j) through (n) with respect to the values by outputting the values, which correspond to a next path in the first, second, third memories when it is determined that the N resultant values are not accumulated in the step (n);

(p) performing the steps (a) through (o) when it is determined that work with respect to the N-th path is completed in the step (n);

(q) performing the steps (a) through (l) when it is determined that the L-1 resultant values are accumulated in the step (m);

(r) multiplying the complex-conjugated values of the resultant value of the step (l) with the resultant value of the step (k);

(s) sequentially-obtaining a number (N) of values by sequentially-inputting the number (N) of data obtained in the step (r) and taking only real values;

(t) cumulatively summing the data obtained in the step (s) N times; and (u) deciding bit values based on logic values identified by identifying the logic values of the result of the step (t).

3. The CDMA demodulating method according to claim 2, wherein the step (i) comprises the steps of:

performing a control operation for storing the PN codes generated in a PN codes-generating unit in the same address as the modulo K-operated result, in the order in which the PN codes are received from the second memory, when the address size of the memory is a predetermined positive integer K; and performing a control operation for outputting data for each of the N paths from the first, second, and third memories.

4. A code division multiple access (CDMA) demodulator used in a CDMA system, comprising:

a first memory for sequentially-storing input data, which are over-sampled by M-fold, where M is a predetermined positive integer;

a PN codes-generating unit for generating different PN codes for each path;

a second memory for sequentially-storing the PN codes output from the PN codes-generating unit;

a first complex-conjugating unit for complex-conjugating the PN codes by inputting from the second memory the PN codes generated by the PN codes-generating unit;

a first multiplying unit for multiplying a complex-conjugated value of one of the values stored in the second memory with one of values stored in the first memory;

a controlling unit for performing a control operation for storing the PN codes generated in the PN codes-generating unit in the same address as the modulo K-operated result, in the order in which the PN codes are received from the second memory and for performing a control operation for outputting data for each path from the first, second, and third memories;

a second multiplying unit for multiplying a value output from the first multiplying unit with the traffic walsh codes of a corresponding path of data stored in the third memory;

a N-path L-accumulating unit for cumulatively-summing the output data of the second multiplying unit L times for each of the N multi-paths to be processed, where L corresponds to the processing gain;

a N-path X-accumulating unit for cumulatively-summing the data output from the first multiplying unit X times for each of the N multi-paths to be processed, where X corresponds to the data bit number of the walsh codes;

a second complex-conjugating unit for complex-conjugating the output values of the N-path X-accumulating unit by inputting the output values of the N-path X-accumulating unit;

a third multiplying unit for multiplying the output values of the second complex-conjugating unit with the output values of the N-path L-accumulating unit;

a real-values extracting unit for sequentially and for each path independently inputting N data values output from the third multiplying unit, and for sequentially-outputting the N independent values for each path, and taking only real values;

an accumulating unit for cumulatively-summing the data sequentially-output from the real-values sampling unit N times; and a bit-deciding unit for deciding bit values based on logic values identified by identifying the logic values of the output of the accumulating unit.

5. The CDMA demodulator according to claim 4, wherein the first memory is formed to have a size big enough to store an input signal having an over-sampling rate M.

6. The CDMA demodulator according to claim 4, wherein the size of the second memory is decided considering a maximum excess delay to be considered in the CDMA receiver when the size of the second memory is K.

7. The CDMA demodulator according to claim 4, wherein the controlling unit performs a control operation for storing the PN codes generated in the PN codes-generating unit in the same address as the modulo K-operated result, in the order in which the PN codes of the second memory are generated, and a control operation for outputting data for each path from the first, second, and third memories.

8. The CDMA demodulator according to claim 4, wherein the size of the third memory is large enough to store the data corresponding to the processing gain L.

\* \* \* \* \*